(12) United States Patent
Luedtke

(10) Patent No.: US 9,893,657 B2
(45) Date of Patent: Feb. 13, 2018

(54) ELECTRIC MOTOR MODE CONTROL

(75) Inventor: Daniel Luedtke, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1154 days.

(21) Appl. No.: 13/607,005

(22) Filed: Sep. 7, 2012

(65) Prior Publication Data
US 2014/0070735 A1    Mar. 13, 2014

(51) Int. Cl.
*H02P 1/46* (2006.01)
*H02P 6/14* (2016.01)
*H02P 27/08* (2006.01)

(52) U.S. Cl.
CPC .............. *H02P 6/14* (2013.01); *H02P 27/085* (2013.01); *B60L 2240/421* (2013.01); *B60L 2240/423* (2013.01); *H02P 2207/05* (2013.01); *H02P 2209/09* (2013.01); *Y02T 10/642* (2013.01); *Y02T 10/7258* (2013.01)

(58) Field of Classification Search
CPC .......... H02P 7/29; H02P 27/08; H02P 27/085; H02P 21/0021; H02P 23/0027
USPC ............... 318/254, 700, 138, 439, 802, 805, 318/432–434, 798, 799, 723, 716, 812
See application file for complete search history.

(56) References Cited

U.S. PATENT DOCUMENTS

| | | | |
|---|---|---|---|
| 5,552,977 A | 9/1996 | Xu et al. | |
| 6,573,745 B2 | 6/2003 | Raftari et al. | |
| 7,576,501 B2 | 8/2009 | Okubo et al. | |
| 7,586,286 B2 | 9/2009 | Cheng et al. | |
| 7,592,765 B2 | 9/2009 | Rahman et al. | |
| 7,595,600 B2 | 9/2009 | Patel et al. | |
| 7,642,737 B2 | 1/2010 | Bae et al. | |
| 8,018,185 B2 | 9/2011 | Yamamoto et al. | |
| 8,080,956 B2 | 12/2011 | Wu | |
| 8,193,749 B2 | 6/2012 | Yamamoto et al. | |
| 2004/0036434 A1* | 2/2004 | Chen et al. .................... | 318/432 |
| 2006/0049792 A1* | 3/2006 | Chen et al. .................... | 318/716 |
| 2006/0055363 A1* | 3/2006 | Patel et al. ..................... | 318/757 |
| 2006/0138994 A1* | 6/2006 | Cheng ............................ | 318/807 |
| 2007/0267990 A1* | 11/2007 | Abolhassani et al. ........ | 318/432 |
| 2008/0116842 A1* | 5/2008 | Cheng et al. .................. | 318/807 |
| 2009/0295316 A1 | 12/2009 | Patel et al. | |
| 2010/0145559 A1 | 6/2010 | Gauthier et al. | |
| 2011/0115318 A1* | 5/2011 | Hashimoto et al. ............ | 310/78 |
| 2011/0241578 A1 | 10/2011 | Kim et al. | |

* cited by examiner

*Primary Examiner* — Bickey Dhakal
(74) *Attorney, Agent, or Firm* — David B. Kelley; Brooks Kushman P.C.

(57) ABSTRACT

A vehicle includes one or more inverter-fed electric machines such as permanent magnet synchronous motors. A controller operates an inverter in either six-step mode or PWM mode depending upon motor speed, motor torque, and the inverter input voltage. A method of selecting the operating mode may determine a transition threshold based on the ratio of rotor speed to inverter input voltage, reducing the approximation error associated with multi-dimensional lookup tables. When the speed and voltage vary while maintaining a constant ratio and constant torque, the transition threshold does not change. Consequently, the controller remains in the same mode.

11 Claims, 8 Drawing Sheets

ELECTRIC MOTOR MODE CONTROL

TECHNICAL FIELD

This disclosure relates to control of electric motors.

BACKGROUND

Permanent magnet synchronous motors (PMSMs) are utilized in various applications because they have generally favorable efficiency characteristics relative to other types of motors. Typically, PMSMs have three separate electrical windings within the stator which are each powered by alternating current (AC) voltages $V_a$, $V_b$, and $V_c$. In operation, the winding currents $I_a$, $I_b$, and $I_c$ each oscillate at a frequency proportional to the rotor speed and are separated by 120 degrees in phase from one another. These winding currents induce a rotating magnetic field which may be out of phase with the rotor. The resulting shaft torque depends upon both the magnitude of the magnetic field and the phase angle relative to the rotor.

For convenience, the winding voltages and currents may be represented by vectors with respect to a rotating reference frame that rotates with the rotor. The mapping between rotor position and the rotating reference frame depends upon the number of poles in the motor. The voltage vector has a direct component $V_d$ and a quadrature component $V_q$. Similarly, the current has a direct component $I_d$ and a quadrature component $I_q$. $V_d$, $V_q$, $I_d$, and $I_q$ do not oscillate based on rotor position.

In certain applications, such as electric vehicles and hybrid electric vehicles, electrical power is available from a non-oscillating direct current (DC) voltage source such as a battery. Therefore, inverters are utilized to convert the non-oscillating voltage $V_{dc}$ into three oscillating voltages. Inverters contain a discrete number of switching devices and are therefore capable of supplying only a discrete number of voltage levels at each of the three motor terminals. For a 2-level inverter, at any moment in time, the switching devices are set to electrically connect each of the three AC motor terminals to either the positive or the negative DC terminal. Thus, eight switching states are available. Two of these switching states, in which all three AC terminals are connected to the same DC terminal, are called zero states. In the remaining six states, one AC terminal is connected to one of the DC terminals and the other two AC terminals are connected to the opposite DC terminal. The inverter is capable of switching rapidly among these eight states.

Some general characteristics of typical inverter-fed PMSMs are illustrated in FIG. 1. In this Figure, the horizontal axis represents rotor speed and the vertical axis represents rotor torque. The operating region depends upon the DC voltage $V_{dc}$. The positive speed, positive torque operating region at a reference DC voltage may be bounded as illustrated by solid lines 110, 112, and 114. At low speeds, the maximum available torque may be limited by a maximum winding current as indicated by line 110. Line 112 indicates a maximum available torque at higher speeds which is limited by the voltage. At point 116, called the corner point, both current and voltage are at their respective maximums. Dotted line 118 indicates the corresponding limit at a higher DC voltage above the reference DC voltage. Line 114 indicates an overall maximum rated speed.

PMSMs may generate either positive or negative torque and may rotate in either positive or negative directions. In the positive speed, negative torque quadrant, a PMSM acts as a generator converting mechanical energy into electrical energy. In this quadrant, the characteristics are similar to that shown in FIG. 1, although the minimum torque curve corresponding to the voltage limit may not be a mirror image of line 112. The negative speed region closely tracks the positive speed region rotated 180 degrees about the origin.

FIG. 2 illustrates typical characteristics of an inverter-fed PMSM with respect to the winding current in the rotor reference frame. In this Figure, the direct component $I_d$ is represented by the horizontal axis and the quadrature component $I_q$ is represented by the vertical axis. Curve 210 represents different combinations of $I_d$ and $I_q$ that would produce a particular output torque. Curves 212, 214, and 216 represent the combinations for progressively higher output torques. Although every point along each of these curves produces the same output torque, some combinations will be associated with higher losses than others. Line 218 represents the most efficient operating point for each level of torque. However, it is not always possible to operate at this condition. Point 220 represents the current that would be induced in the windings by the permanent magnets in the rotor as the rotor spins at a particular speed. The voltage applied by the inverter alters the winding current from this condition. Curve 222 represents the boundary of the conditions that are achievable by the inverter at a particular rotor speed and bus voltage level. At higher bus voltages or lower rotor speeds, the boundary expands as shown by dashed curve 224.

Two basic control methods are known for switching among inverter states to regulate torque output of a PMSM. In the six-step method, the inverter cycles through the six non-zero states once per cycle of the rotor, producing an oscillating voltage and current in each winding. A rotor cycle is defined relative to motor poles and does not necessarily correspond to a complete revolution. The amplitude of the AC voltage is dictated by the DC voltage. The torque is dictated by the DC voltage, the rotor speed, and the phase difference between these quasi-sinusoidal AC voltage signals and the rotor position. A controller issues commands to the inverter indicating when to switch to the next state in the sequence. In the PWM method, the inverter switches very rapidly among two of the non-zero states and one of the zero states. A controller specifies what fraction of the time should be spent in each of these three states by specifying pulse width modulation (PWM) duty cycles. The controller updates these duty cycles at regular intervals such that the frequency of updates is significantly higher than the frequency of the rotor rotation.

SUMMARY OF THE DISCLOSURE

In one embodiment, a method of operating an inverter is disclosed. The inverter is connected to an electrical bus and to an electric machine such as a permanent magnet synchronous motor. The method computes a normalized speed by dividing a rotor speed of the electric machine by a voltage of the electrical bus. A transition threshold is computed based on the normalized speed. PWM mode is selected if a torque request is less than the transition threshold. If the torque request exceeds the transition threshold, six-step mode is selected. In some embodiments, a second transition threshold, with a negative value, may be computed based on normalized speed. Six-step mode may be selected if the torque request is less than this second transition threshold.

In another embodiment, a vehicle includes an electric machine such as a permanent magnet synchronous motor, an inverter, and a controller. The controller is configured to maintain operation in PWM mode while the speed of the electric machine and the input voltage of the inverter vary according to a fixed ratio and the electric machine torque is constant. When the operating point is near a transition boundary, the controller may be configured to transition from PWM mode to six-step mode in response to either an increase in speed or a decrease in voltage while maintaining the torque. The controller may also be configured to maintain operation in six-step mode while the speed of the electric machine and the input voltage of the inverter vary according to the fixed ratio and the electric machine torque is constant at a different level. When the operating point is near a transition boundary, the controller may be configured to transition from six-step mode to PWM mode in response to either a decrease in speed or an increase in voltage while maintaining the torque. In some embodiments, the input voltage of the inverter may be regulated by a dc-to-dc converter which establishes a bus voltage distinct from the voltage of a battery.

In another embodiment, a controller includes an input interface, an output interface, and control logic. The input interface receives signals indicating a voltage of an electrical bus and a speed of an electric machine. The output interface transmits inverter state and duty cycle commands to an inverter. The inverter, in turn, supplies current to the electric machine resulting in a torque. The control logic is programmed to operate the inverter in PWM mode at a given torque, speed, and voltage. If the torque request is constant and speed and voltage increase proportionately, the control logic is programmed to stay in PWM mode. However, for some combinations of speed, torque, and voltage, the controller is programmed to transition from PWM mode to six-step mode in response to any increase in speed or decrease in voltage while maintaining the torque. While operating in six-step mode at constant torque, the control logic may be programmed to stay in six-step mode as the speed and voltage decrease proportionately. However, for some combinations of speed, torque, and voltage, the controller is programmed to transition from six-step mode to PWM mode in response to any decrease in speed or increase in voltage while maintaining the torque. In some embodiments, the torque at which the controller transitions from PWM mode to six-step mode for a particular speed and voltage may be higher than the torque at which the controller transitions from six-step mode to PWM mode at the same speed and voltage.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 3:
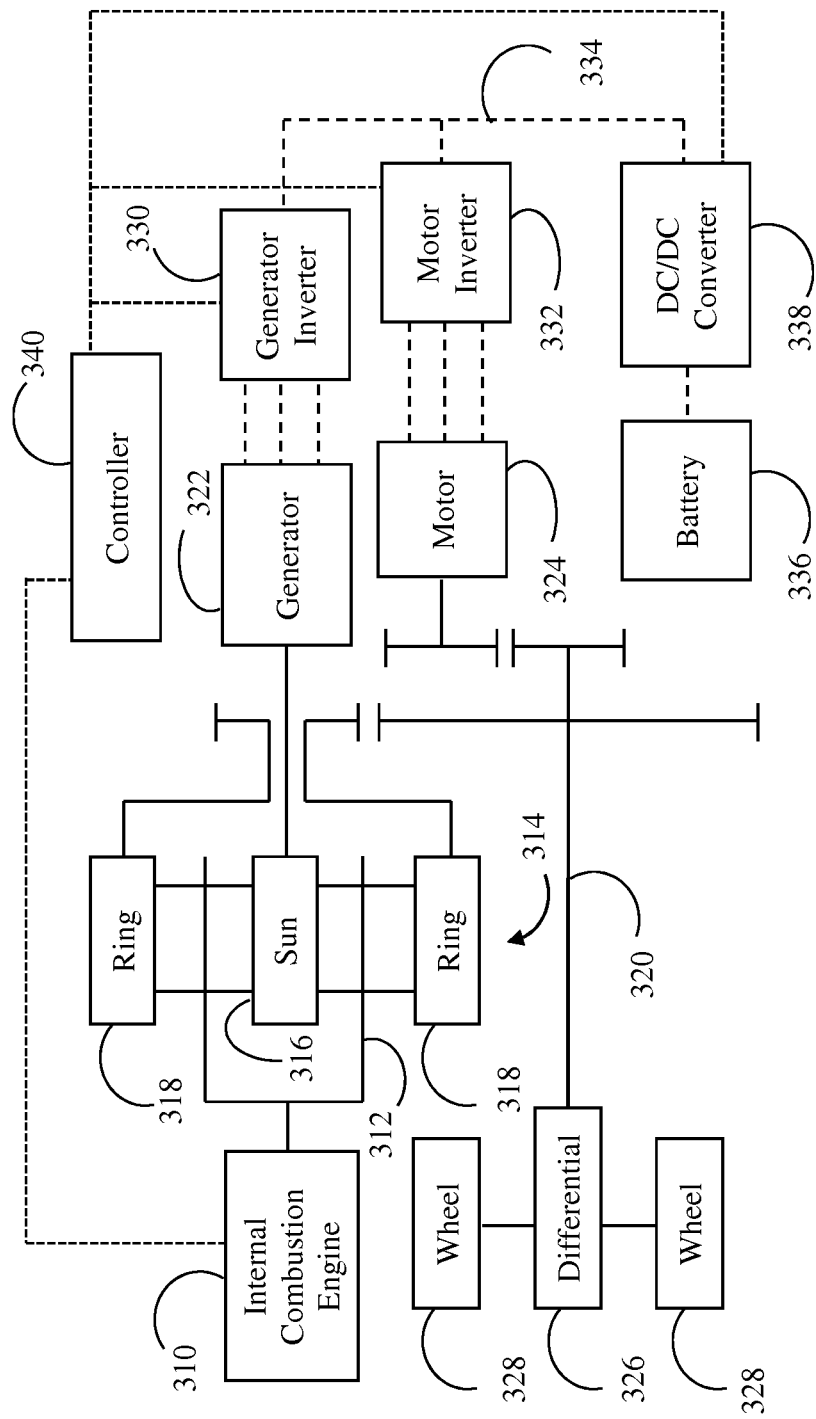
FIG. 3 is a schematic diagram of an exemplary hybrid electric powertrain.

A schematic diagram of an exemplary hybrid electric powertrain is illustrated in FIG. 3. However, the claimed invention is not limited to this powertrain topology. Internal combustion engine 310 drives carrier 312 of planetary gear set 314. The engine torque is divided by gear set 314 between sun gear 316 and ring gear 318. The ring gear torque is transmitted mechanically to output shaft 320. The sun gear torque is absorbed by generator 322. Motor 324 is driveably connected to output shaft 320. Throughout this description, the terms generator and motor are used merely as labels to identify these components. Both generator 322 and motor 324 are reversible electrical machines capable of both converting mechanical shaft power into electrical power and converting electrical power into mechanical shaft power. Control methods are described with respect to the motor but are equally applicable to the generator. The driveshaft is driveably connected to a differential 326 which divides the power between left and right wheels 328 while allowing slight differences in wheel speeds. Electrical power connections are illustrated by dashed lines with long dashes. Generator 322 and motor 324 are electrically powered by inverters 330 and 332 respectively via three phase power circuits. Inverters 330 and 332 draw power from or supply power to DC electrical bus 334. Electrical power is stored in battery 336. DC to DC Converter 338 converts the voltage level of battery 336 to the voltage level of DC bus 334. The DC bus voltage may be either higher or lower than the battery voltage. Control signal connections are illustrated by dashed lines with short dashes. Controller 340 issues control signals to DC to DC converter 338 specifying the desired voltage for the DC electrical bus 334. Controller 340 also issues control commands to engine 310 and inverters 330 and 332 to regulate the torque generated by the engine, generator 322, and motor 324 respectively. If the torque actually delivered by motor 324 differs significantly from the requested torque, then vehicle acceleration will not match the driver's expectation. If the torque actually delivered by generator 322 differs significantly from the requested torque, then engine speed will depart from expected behavior.

Figure 4:
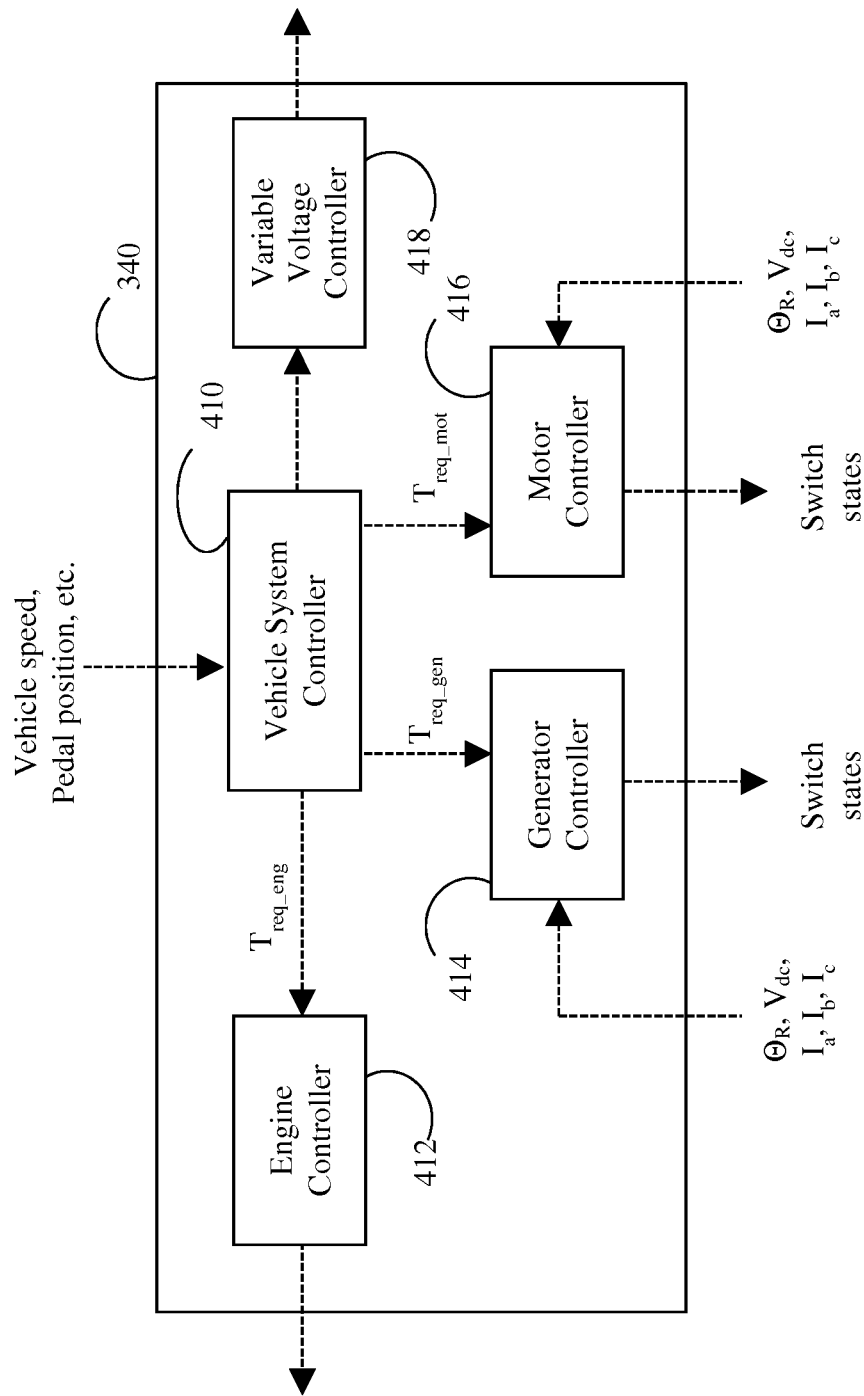
FIG. 4 is a controller schematic in an exemplary hybrid electric powertrain.

Controller 340 is illustrated schematically in more detail in FIG. 4. Vehicle system controller 410 receives signals indicating vehicle speed, the position of the accelerator pedal and brake pedal, and various other vehicle data. Based on this data, the vehicle system controller determines a target DC bus voltage and a target output shaft torque and issues torque requests $T_{req\_eng}$ to engine controller 412, $T_{req\_gen}$ to generator controller 414, and $T_{req\_mot}$ to motor controller 416. The output of generator controller 414 and motor controller 416 are switch states for switches within inverters 330 and 332 respectively. These controllers receive input signals indicating the angular position of the corresponding rotor, labeled $\Theta_R$, the voltage of DC bus 334, labeled $V_{dc}$, and the current in each winding, labeled $I_a$, $I_b$, and $I_c$. Variable Voltage Controller 418 issues commands to DC to DC converter 338 to effectuate the target bus voltage. Controllers 410, 412, 414, 416, and 418 may be implemented as a single micro-controller or as multiple communicating controllers.

Figure 5:
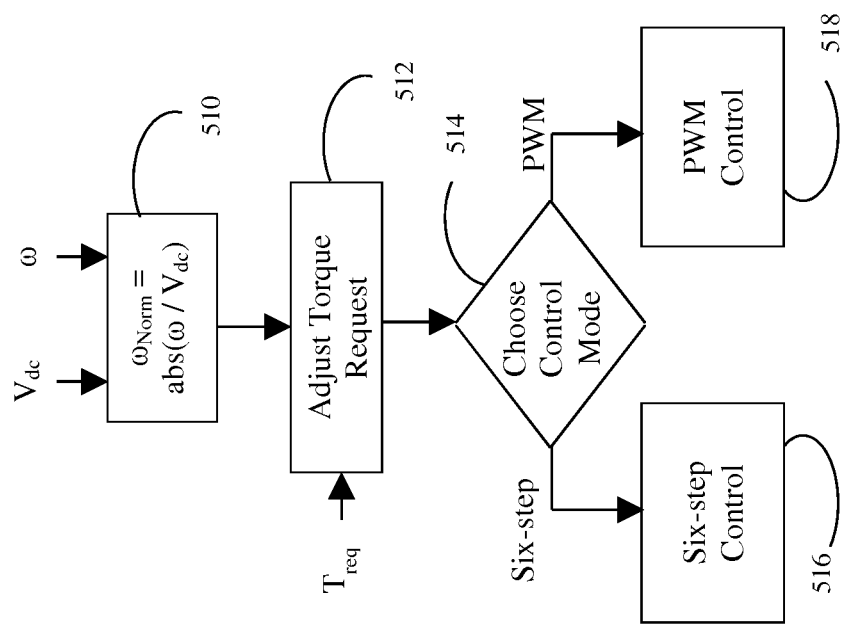
FIG. 5 is a flow chart for the control method for permanent magnet synchronous motors.

FIG. 5 illustrates the computations for each update. At 510, the controller computes a normalized speed, $\omega_{Norm}$, by dividing the rotor speed by the bus voltage. At 512, the controller adjusts the torque request from the vehicle system controller if necessary to ensure that the requested torque is within the motor operating region for the current rotor speed and bus voltage. At 514, the controller selects between PWM and six-step control methods based on the adjusted torque request and the normalized speed. If the six-step mode is selected, the controller computes inverter commands at 516 based on the six-step method. If the PWM mode is selected, the controller computes inverter commands at 518 based on the PWM method.

Figure 1:
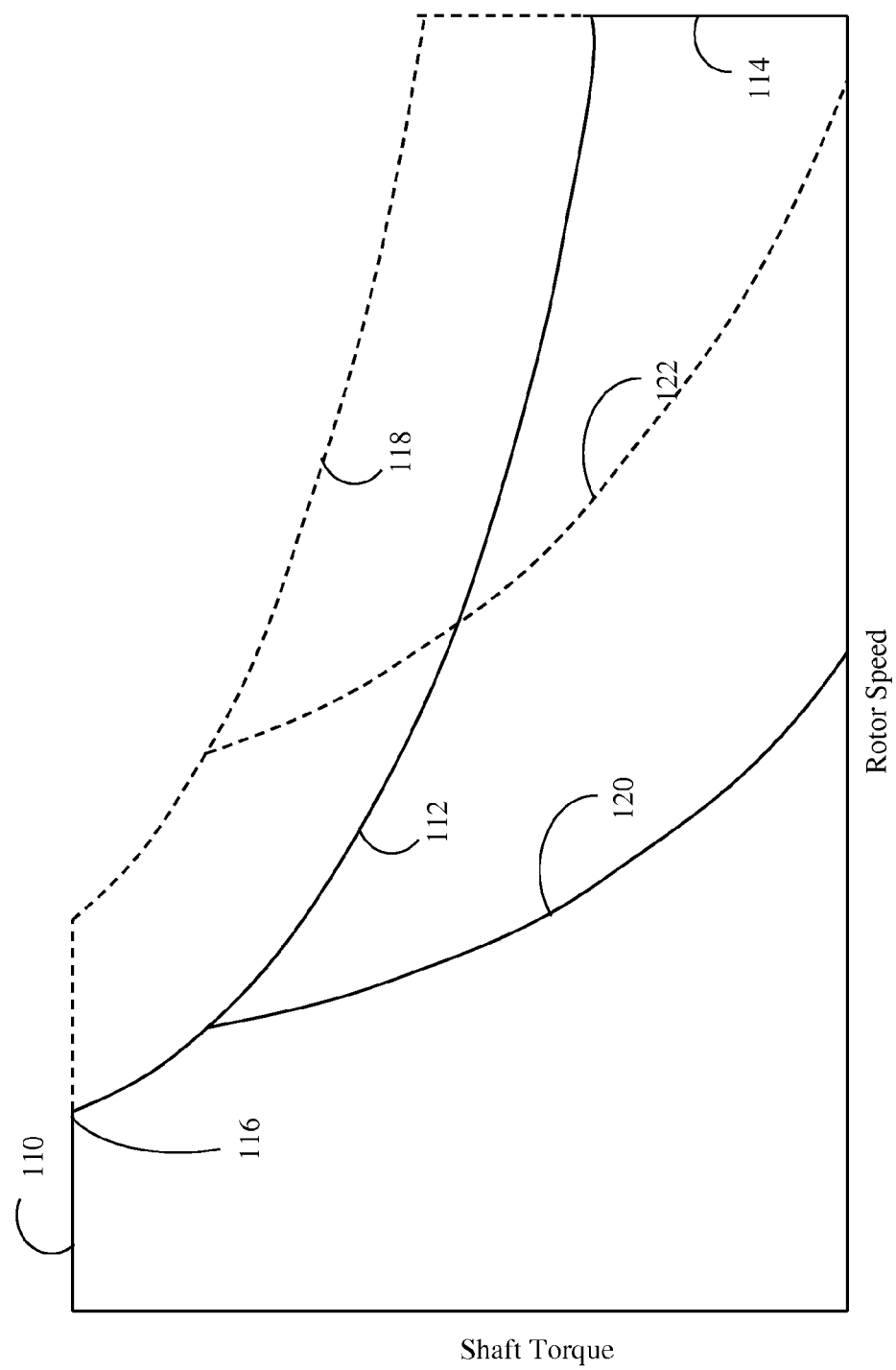
FIG. 1 is a graph of general characteristics of permanent magnet synchronous motors in terms of rotor speed and rotor torque.

The six-step method is preferred when the torque demand and rotor speed are high and the DC bus voltage is low. The PWM method is preferred for low torque demand, low rotor speed, high bus voltage conditions. Line 120 in FIG. 1 indicates an exemplary boundary between these regions at a particular reference voltage. The six-step method is preferred in the region to the upper right of line 120 while the PWM method is preferred in the region to the lower left. Dotted line 122 shows how this boundary shifts when the bus voltage is increased.

Controllers commonly use lookup tables to represent non-linear functions such as the boundary between the six-step region and the PWM region. Since the transition torque is a function of both the rotor speed ω and the bus voltage $V_{dc}$, a multi-dimensional look-up table, such as Table 1, would typically be used. If either of the independent variables, in this case rotor speed ω and bus voltage $V_{dc}$, fall between the tabulated values, the controller may select one of the neighboring values or interpolate between them. For a non-linear function, interpolation introduces some error relative to the underlying function. Typically, lookup tables are populated during vehicle calibration based on experimental data. Populating the table requires experimentation at a variety of voltage levels. Using a large number of different voltage levels reduces the approximation error but increases the effort required to populate the tables, the memory in the controller consumed by the tables, and the time required to look up a value.

TABLE 1

|  | $V_1$ | $V_2$ | $V_3$ | $V_m$ |
|---|---|---|---|---|
| $\omega_1$ | $T_{11}$ | $T_{12}$ | $T_{13}$ | $T_{1m}$ |
| $\omega_2$ | $T_{21}$ | $T_{22}$ | $T_{23}$ | $T_{2m}$ |
| $\omega_3$ | $T_{31}$ | $T_{32}$ | $T_{33}$ | $T_{3m}$ |
| $\omega_4$ | $T_{41}$ | $T_{42}$ | $T_{43}$ | $T_{4m}$ |
| $\omega_n$ | $T_{n1}$ | $T_{n2}$ | $T_{n3}$ | $T_{nm}$ |

An alternative to using a multi-dimensional look-up table is to use the single independent variable $\omega_{Norm}$ as calculated at 510 in FIG. 5. Table 2 illustrates a table of transition torque vs. normalized speed. Using a table with a single independent variable reduces the approximation error and the calibration effort. The single independent variable lookup table may be used to improve PMSM performance while reducing the controller memory used.

TABLE 2

| $\omega_{Norm\_1}$ | $T_1$ |
|---|---|
| $\omega_{Norm\_2}$ | $T_2$ |
| $\omega_{Norm\_3}$ | $T_3$ |
| $\omega_{Norm\_4}$ | $T_4$ |
| $\omega_{Norm\_5}$ | $T_5$ |
| $\omega_{Norm\_n}$ | $T_n$ |

Figure 6:
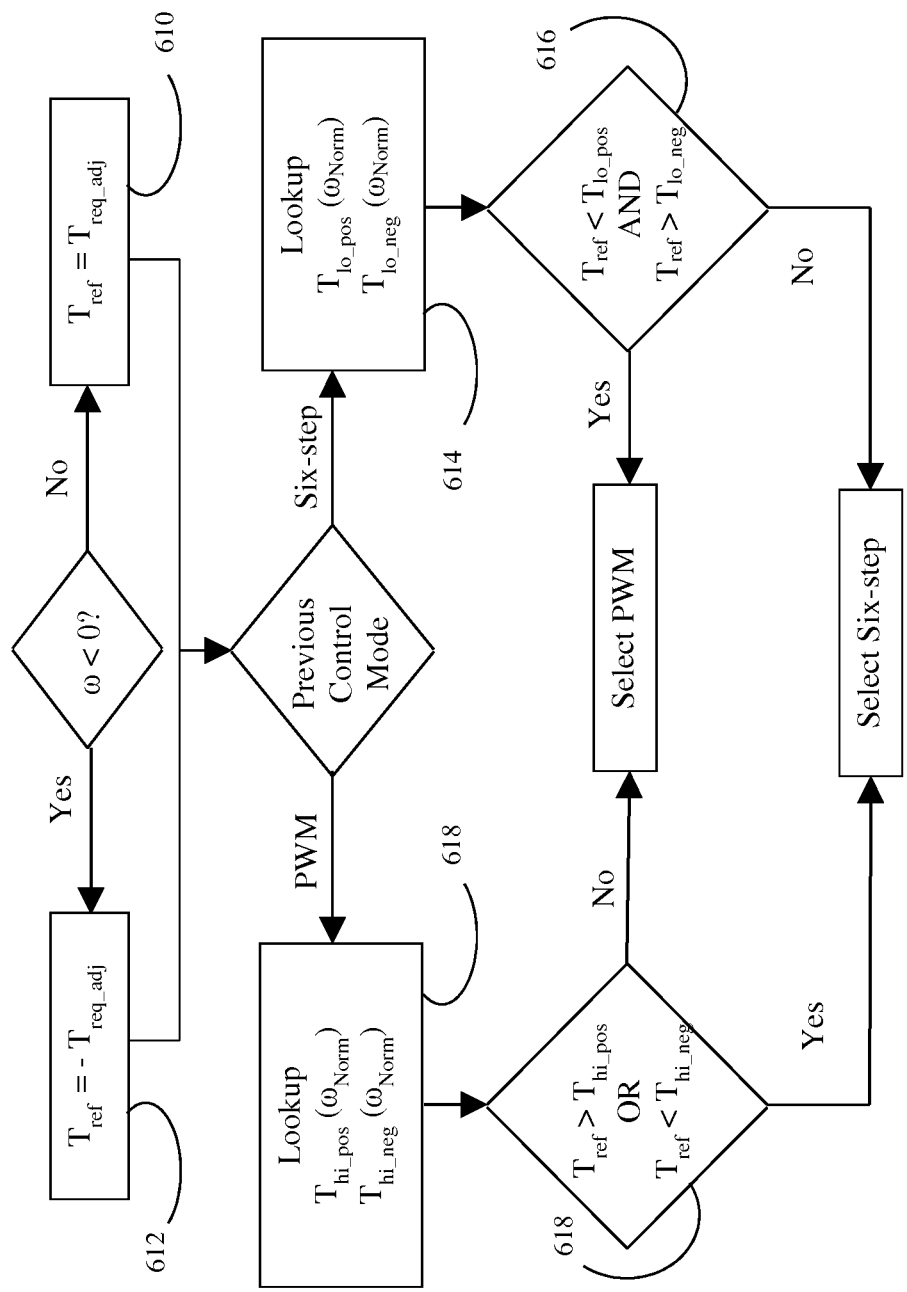
FIG. 6 is a flow chart for determining which control algorithm, six-step or PWM, should be utilized to set the motor torque.

FIG. 6 illustrates a method used at 514 in FIG. 5 to determine which control algorithm, six-step or PWM, should be utilized to set the motor torque. Calibration tables store two functions of normalized speed, $\omega_{Norm}$. The first table, $T_{lo\_pos}$, is slightly below the ideal transition torque while the second table, $T_{hi\_pos}$, is slightly above the ideal transition torque. The mode changes from six-step to PWM when the operating point changes from above $T_{lo\_pos}$ to below $T_{lo\_pos}$. Similarly, the mode changes from PWM to six-step when the operating point changes from below $T_{hi\_pos}$ to below $T_{hi\_pos}$. If the operating point is between these two functions, the mode remains the same as the previous time step. This hysteresis avoids mode changes based on small changes in operating point when operating near the boundary. Similar tables, $T_{lo\_neg}$ and $T_{hi\_neg}$, characterize the mode boundary in the negative torque operating region. The negative speed region is accommodated by using a surrogate torque request $T_{ref}$ which is set equal to $T_{req\_adj}$ at 610 when the rotor speed is positive and $-T_{req\_adj}$ at 612 when the rotor speed is negative. If the controller was operating in six-step mode during the previous update, then it looks up the values at the current normalized speed at 614. At 616, the controller determines whether the operating point has moved into the region between the positive and negative torque boundaries. If so, it transitions to PWM mode, otherwise, it remains in six-step mode. If the controller was previously operating in PWM mode, it looks up the values at the current normalized speed at 618. At 620, the controller determines whether the operating point has moved outside the region between the positive and negative torque boundaries. If so, it transitions to six-step mode, otherwise, it remains in PWM mode.

When a multi-dimensional table is used, if the rotor speed and bus voltage vary, the mode transition thresholds will vary even if the ratio of rotor speed to bus voltage remains constant. Consequently, mode transition will sometimes occur as speed and voltage vary at a constant ratio and the torque request remains constant. When the method of FIG. 6 is used, if the rotor speed and bus voltage vary while maintaining a constant ratio of rotor speed to bus voltage, the mode transition thresholds will remain constant. Therefore, at a constant torque request and constant ratio of speed to voltage, no mode transitions will occur.

Figure 2:
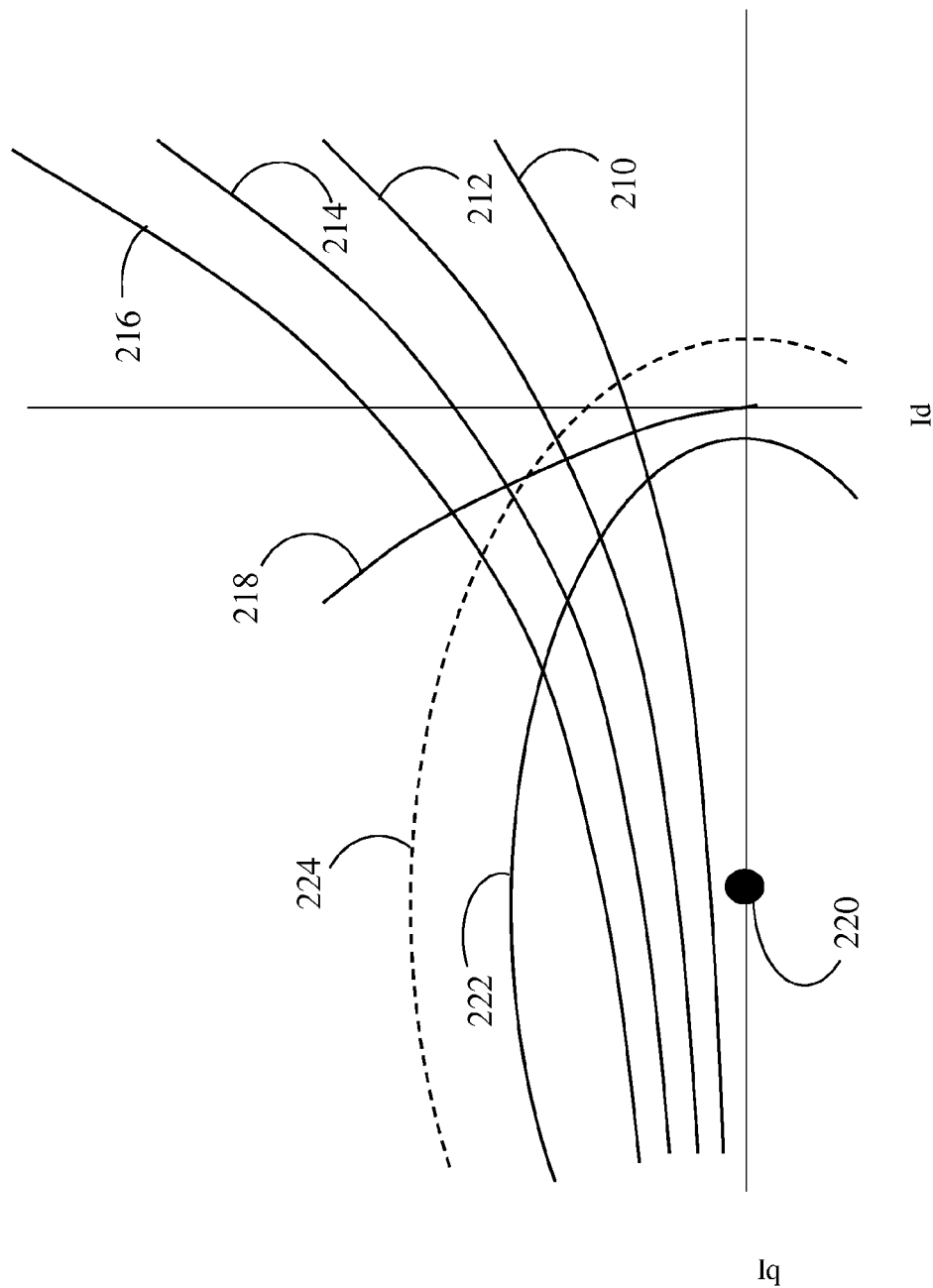
FIG. 2 is a graph of general characteristics of permanent magnet synchronous motors in terms of the direct and quadrature components of the winding current.

In six-step mode, the components of the winding current, $I_d$, and $I_q$, are located on a curve such as curve 222 or 224 in FIG. 2. The curve is determined by the bus voltage $V_{dc}$ and the rotor speed w. The position along the curve is determined by the voltage angle, $\Theta_V$. The controller adjusts $\Theta_V$ by adjusting the timing at which it switches the inverter to the next non-zero inverter states. The target voltage angle $\Theta^*_V$ is a non-linear function of the adjusted torque request, rotor speed, and bus voltage. Typically, a non-linear function of multiple parameters is represented in a controller by a multi-dimensional table. When the actual value of the independent parameters fall between the tabulated values, the controller can use the higher value, use the lower value, or interpolate between them. Each of these choices introduces error in $\Theta^*_V$ which results in the motor torque departing from the adjusted torque request. For example, if the rotor speed and bus voltage vary while maintaining a constant ratio of rotor speed to bus voltage, $\Theta^*_V$ and the motor torque output will vary.

Figure 7:
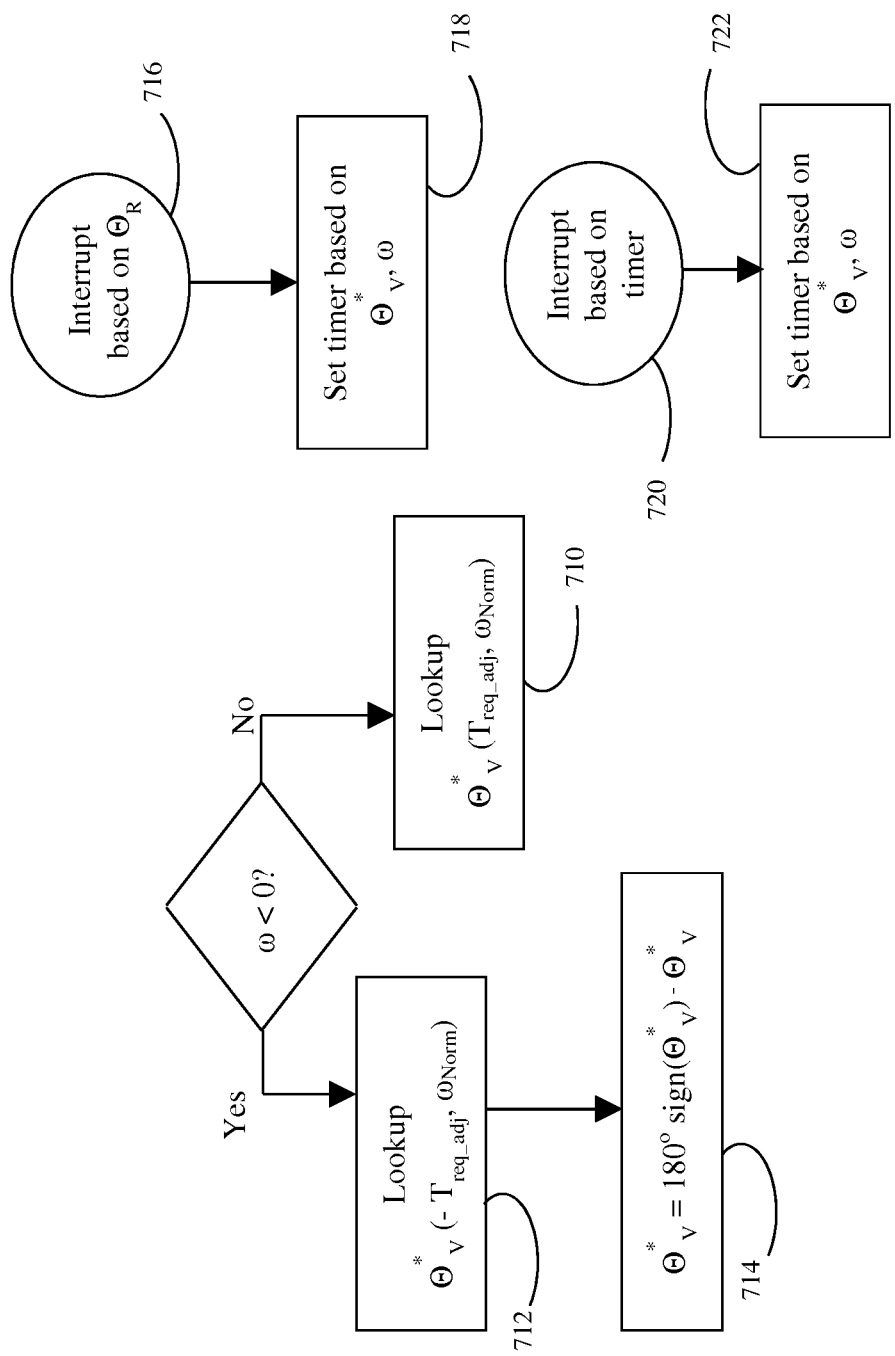
FIG. 7 is a flow chart for determining inverter state using six-step control.

FIG. 7 illustrates a method of computing $\Theta^*_V$ using a table with only two independent parameters, the adjusted torque request and the normalized speed, $\omega_{Norm}$. This table is populated during calibration based on testing to characterize the motor. The testing during calibration may occur at bus voltages that differ from the current bus voltage. For positive rotor speeds, the target voltage angle is determined at 710 with a single table lookup. For negative rotor speeds, the controller relies on the symmetry of motor behavior by looking up a target voltage angle for a corresponding positive speed operating point at 712 and adjusting it for the negative speed operating point at 714. Due to the critical timing of the state switching, the switching is performed by functions that respond to interrupts. A first interrupt occurs at 716 whenever the rotor passes a reference position. At 718, an interrupt handler computes the time at which the state change should occur based on $\Theta^*_V$ and the rotor speed $\omega$ and sets a timer. A second interrupt occurs at 720 when this timer expires. At 722, an interrupt handler issues a command to the inverter to switch to the next non-zero state. When the method of FIG. 7 is used, if the rotor speed and bus voltage vary while maintaining a constant ratio of rotor speed to bus voltage, $\Theta^*_V$ will remain constant.

In PWM mode, the components of the winding current, $I_d$, and $I_q$, are located in a region bounded by a curve such as curve 222 or 224 in FIG. 2. As with the six-step method, the curve is determined by the bus voltage $V_{dc}$ and the rotor speed $\omega$, although the curve may be slightly inside the six-step curve for a particular $V_{dc}$ and $\omega$. The controller adjusts $I_d$ and $I_q$ by adjusting $V_d$ and $V_q$ using closed loop control. The controller then translates $V_d$ and $V_q$ into PWM duty cycle commands to the inverter based on the rotor position $\Theta_R$.

The target components of the winding current, $I^*_d$, and $I^*_q$, are non-linear functions of the adjusted torque request, rotor speed, and bus voltage. At low torque requests, low speeds, and high bus voltages, $I^*_d$ and $I^*_q$ are selected along the line 218 in FIG. 2 to yield the most efficient operation. In this region, $I^*_d$ and $I^*_q$ are not sensitive to small changes in bus voltage or rotor speed. However, at high torque requests, high speeds, and low bus voltages, operation along line 218 is not possible. The most efficient achievable operating point is located along a curve, such as 222, which represents the boundary of the operating region at the current rotor speed and bus voltage. This area of operation is called the field weakening region. In the field weakening region, $I^*_d$ and $I^*_q$ are both sensitive to changes in bus voltage or rotor speed. Furthermore, the relationship between $I^*_d$ and $I^*_q$ is important.

As with voltage angle, $I^*_d$ and $I^*_q$ would typically be represented in a controller by a multi-dimensional table. When the actual value of the bus voltage falls between tabulated values, the conservative approach would be to use the lower tabulated value. This would result in a combination of $I^*_d$ and $I^*_q$ that produce the requested torque but fall well inside the region bounded curve 222 and therefore result in less efficient operation. If interpolation is used, the resulting combination of $I^*_d$ and $I^*_q$ may not produce the requested torque. Furthermore, it may be necessary to calibrate the tables conservatively in order to ensure that the resulting points fall within curve 222, resulting in compromised efficiency. In either approach, if the rotor speed and bus voltage vary while maintaining a constant ratio of rotor speed to bus voltage, $I^*_d$ and $I^*_q$ will vary.

Figure 8:
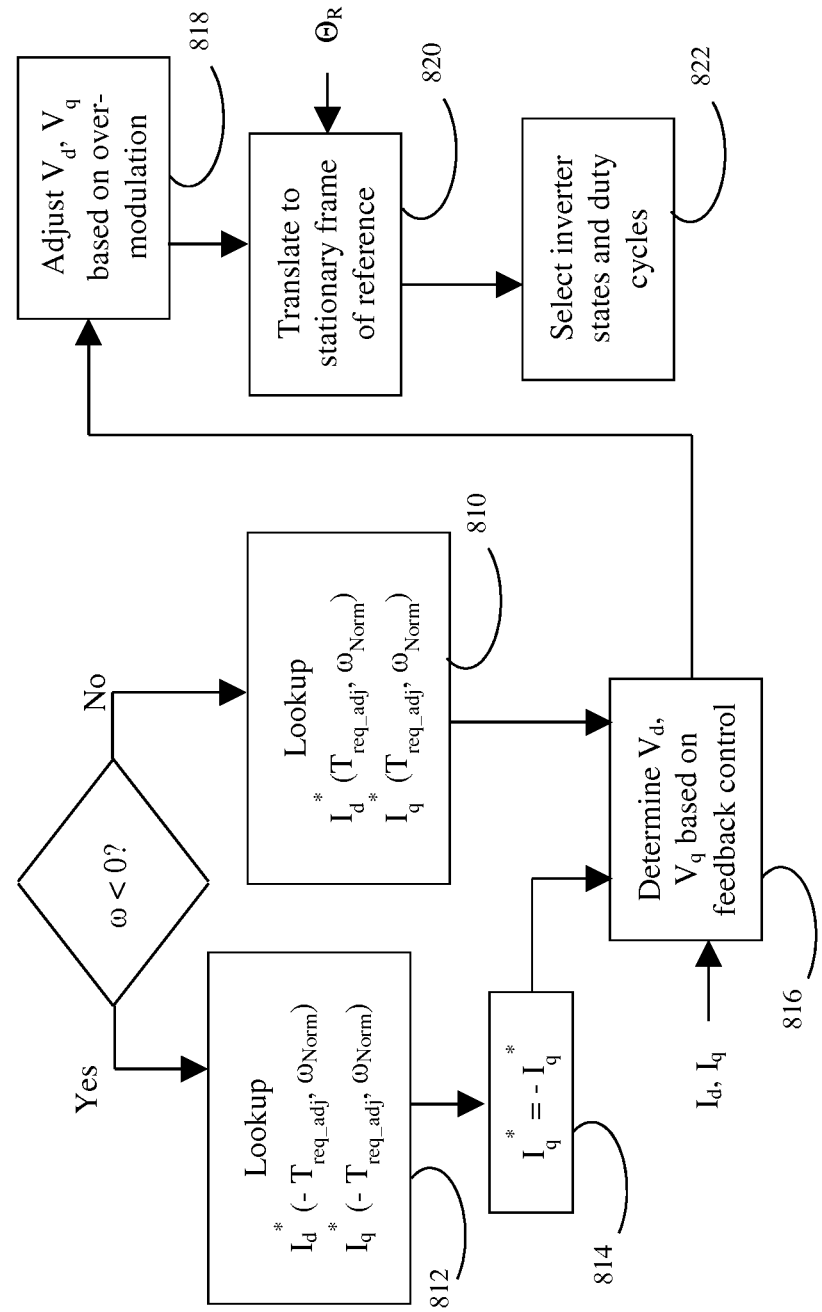
FIG. 8 is a flow chart for determining inverter states and duty cycles using PWM control.

FIG. 8 illustrates a method of computing $I^*_d$ and $I^*_q$ using tables with only two independent parameters, the adjusted torque request and the normalized speed, $\omega_{Norm}$. For positive rotor speeds, the controller looks up $I_q^*$ and $I_d^*$ in the tables at 810. For negative rotor speeds, the controller looks up the values at 812 based on an opposite direction torque and then changes the sign of $I_q^*$ at 814. Next, the controller computes voltages in the rotor reference frame, $V_d$ and $V_q$, using closed loop control with measured values of $I_d$ and $I_q$ as feedback signals at 816. When the magnitude of the vector sum of $V_d$ and $V_q$ is near $V_{dc}$, over-modulation at 818 may be necessary in order to deliver the requested torque. At 820, $V_d$ and $V_q$ are translated in the stationary reference frame based on the rotor position, $\Theta_R$. Each of the six non-zero inverter states corresponds to a vector in the stationary reference frame. These vectors separate the space into six 60° sectors. At 822, the controller selects the two non-zero inverter states corresponding to the two vectors that bound the translated $V_d$, $V_q$ voltage vector. Then, it computes two duty cycles such that the sum of the two vectors weighted by the respective duty cycles is equal to the translated $V_d$, $V_q$ voltage vector.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric machine;
   an inverter; and
   a controller configured to
     operate the electric machine in pulse width modulation mode at a speed and torque of the electric machine and an input voltage of the inverter, the speed and the voltage related by a ratio, and
     maintain operation in pulse width modulation mode as speed and voltage increase proportionately according to the ratio while maintaining the torque, wherein the controller is further configured to transition from pulse width modulation mode to six-step mode in response to any increase in speed while maintaining the voltage and torque.

2. The vehicle of claim 1 wherein the controller is further configured to transition from pulse width modulation mode to six-step mode in response to any decrease in voltage while maintaining the speed and torque.

3. The vehicle of claim 2 wherein the controller is further configured to:
   operate the electric machine in six-step mode at the speed and voltage such that the electric machine produces a second torque; and
   maintain operation in six-step mode as speed and voltage decrease proportionately according to the ratio while maintaining the second torque.

4. The vehicle of claim 3 wherein the controller is further configured to transition from six-step mode to pulse width modulation mode in response to any decrease in speed while maintaining voltage and second torque.

5. The vehicle of claim 4 wherein the controller is further configured to transition from six-step mode to pulse width modulation mode in response to any increase in voltage while maintaining the speed and second given torque.

6. The vehicle of claim 1 further comprising:
   a battery; and
   a dc-to-dc converter electrically connected to both the battery and the inverter.

7. A controller comprising:
   an input interface configured to receive signals indicating a voltage of an electrical bus and a speed of an electric machine;
   an output interface configured to transmit inverter state and duty cycle commands to an inverter such that the inverter supplies current to the electric machine resulting in a torque; and
   control logic programmed to
      operate the inverter in pulse width modulation mode at a given speed, given voltage, and first given torque, the given speed and given voltage related by a ratio,
      maintain operation in pulse width modulation mode as speed and voltage increase proportionately from the given speed and given voltage according to the ratio while maintaining the first given torque, and
      transition from pulse width modulation mode to six-step mode in response to any increase in speed from the given speed while maintaining the first given torque and given voltage.

8. The controller of claim 7 wherein the control logic is further programmed to transition from pulse width modulation mode to six-step mode in response to any decrease in voltage from the given voltage while maintaining the given speed and first given torque.

9. The controller of claim 8 wherein the control logic is further programmed to
   operate the electric machine in six-step mode at the given speed and given voltage such that the electric machine produces a second given torque;
   maintain operation in six-step mode as speed and voltage decrease proportionately from the given speed and given voltage according to the ratio while maintaining the second given torque; and
   transition from six-step mode to pulse width modulation mode in response to any decrease in speed from the given speed while maintaining the given voltage and second given torque.

10. The controller of claim 9 wherein the control logic is further programmed to transition from six-step mode to pulse width modulation mode in response to any increase in voltage from the given voltage while maintaining the given speed and second given torque.

11. The controller of claim 10 wherein the first given torque and second given torque are both greater than zero and the first given torque is greater than the second given torque.

* * * * *